United States Patent [19]

Fry

[11] 3,831,692
[45] Aug. 27, 1974

[54] DRIVE TOWER FOR CIRCULAR IRRIGATION SYSTEM

[75] Inventor: Denton E. Fry, Fort Atkinson, Wis.

[73] Assignee: Durst Corporation, Beloit, Wis.

[22] Filed: Oct. 17, 1972

[21] Appl. No.: 298,288

[52] U.S. Cl............... 180/14 R, 74/116, 180/70 R, 192/43.1, 239/177, 180/98
[51] Int. Cl............................................. B60k 7/02
[58] Field of Search................ 180/14 R, 36, 70 R; 239/177; 74/116, 117; 192/43.1

[56] References Cited
UNITED STATES PATENTS

| | | | |
|---|---|---|---|
| 1,150,235 | 8/1915 | Ward | 74/116 |
| 1,486,921 | 3/1924 | Reiss | 192/43.1 |
| 2,256,466 | 9/1941 | Cullin | 74/116 |
| 3,583,639 | 6/1971 | Cornelius | 239/212 |
| 3,623,662 | 11/1971 | Reinke | 239/177 |
| 3,712,544 | 1/1973 | Ririe | 239/212 |
| 3,720,374 | 3/1973 | Ross | 239/212 |

Primary Examiner—David Schonberg
Assistant Examiner—John P. Silverstrim
Attorney, Agent, or Firm—Wolfe, Hubbard, Leydig, Voit & Osann, Ltd.

[57] ABSTRACT

A drive tower for a circular irrigation system includes an upright frame for supporting a water pipe which extends radially from a central pivot. The frame is supported on wheels power rotated by an electric motor to drive the tower in a circular path around the pivot. To turn the wheels, the motor rotates a power shaft to reciprocate two pawls through alternating power strokes by means of two eccentrics each of which is mounted on the shaft and rotates within one of the pawls. As the pawls are alternately driven through their power strokes, they push against the teeth of a drive gear keyed to a drive shaft which connects to the wheels so that, as the pawls rotate the gear, the wheels are turned to move the tower. The pawls are shaped symmetrically so that either of their opposite ends may fit between the teeth of the gear, and reversible spring means selectively hold the adjacent ends of the pawls against the gear during the power stroke to drive the gear in one direction. By reversing the action of the spring means, the other adjacent ends of the pawls are pressed against the gear so the latter may be driven in the opposite direction. Solenoids controlling the reversal of the spring means enable an operator to reverse the direction of movement of the tower from a remote location.

6 Claims, 7 Drawing Figures

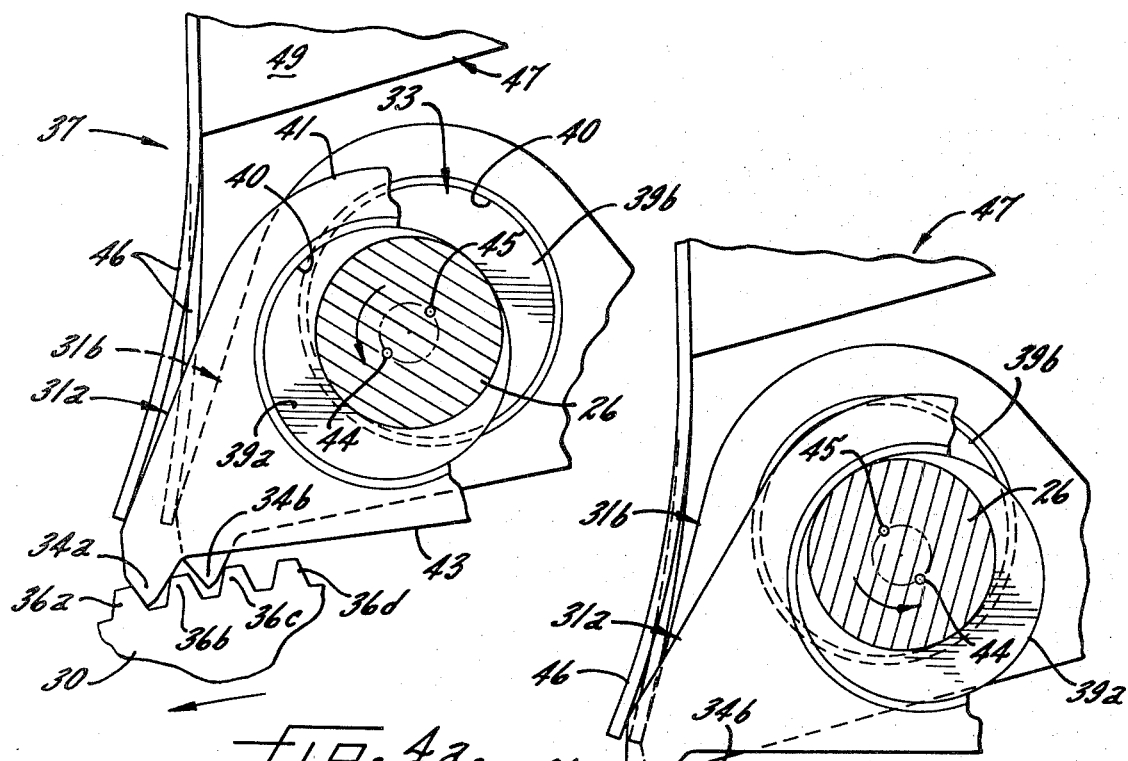
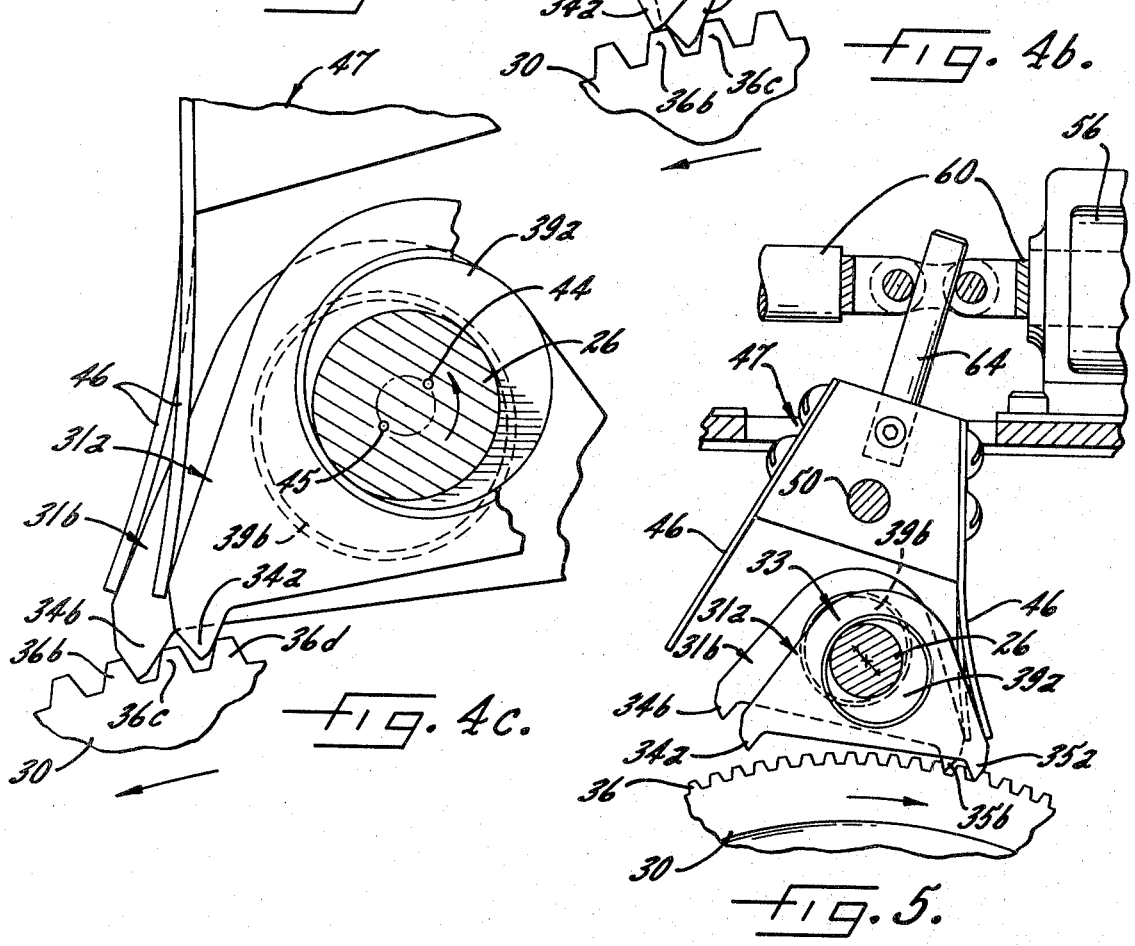

3,831,692

DRIVE TOWER FOR CIRCULAR IRRIGATION SYSTEM

BACKGROUND OF THE INVENTION

The present invention relates to a circular irrigation system particularly suitable for use in arid regions to provide water for agricultural purposes. Typically, such systems include a plurality of spaced towers connected together by truss sections which support an elevated water pipe between the towers. The pipe extends radially from a central pivot communicating with a high pressure water supply and water in the pipe is forced out through a number of sprinkler heads or spray guns spaced along the length of the pipe. Each tower in the system is supported on wheels which are power rotated at extremely slow speeds to move the tower in a circular path about the pivot thereby to irrigate a circular tract of land.

SUMMARY OF THE INVENTION

The general object of the present invention is to provide a circular irrigation system of the above general character which is less expensive to manufacture and to operate by virtue of a unique improvement in the drive tower enabling the length of the truss sections to be increased without having to increase the size of the motors required to drive the tower. A more detailed object is to accomplish the foregoing through the provision of a novel and more efficient drive mechanism for power turning of the wheels.

A further object is to make novel use in the drive mechanism of two pawls for driving the wheels in a unique manner whereby each pawl is driven by a motor through a power stroke alternately of the other to turn the wheels more easily and efficiently while at the same time avoiding virtually any likelihood of the wheels backing up.

The invention also resides in the novel means for reversing the direction of the power stroke of the pawls to enable the tower to be driven in either a forward or a reverse direction and in the provision of unique means for controlling the reversing means from a location remote from the tower.

These and other objects and advantages of the present invention will become more apparent from the following detailed description when taken in conjunction with the accompanying drawings.

BRIEF DESCRIPTION OF THE DRAWINGS

FIGS. 4a, 4b and 4c are enlarged fragmentary views similar to FIG. 3 showing parts in moved positions.

FIG. 5 is a fragmentary elevational view similar to FIG. 3 showing parts in other moved positions.

DETAILED DESCRIPTION OF THE PREFERRED EMBODIMENT

Figure 1:
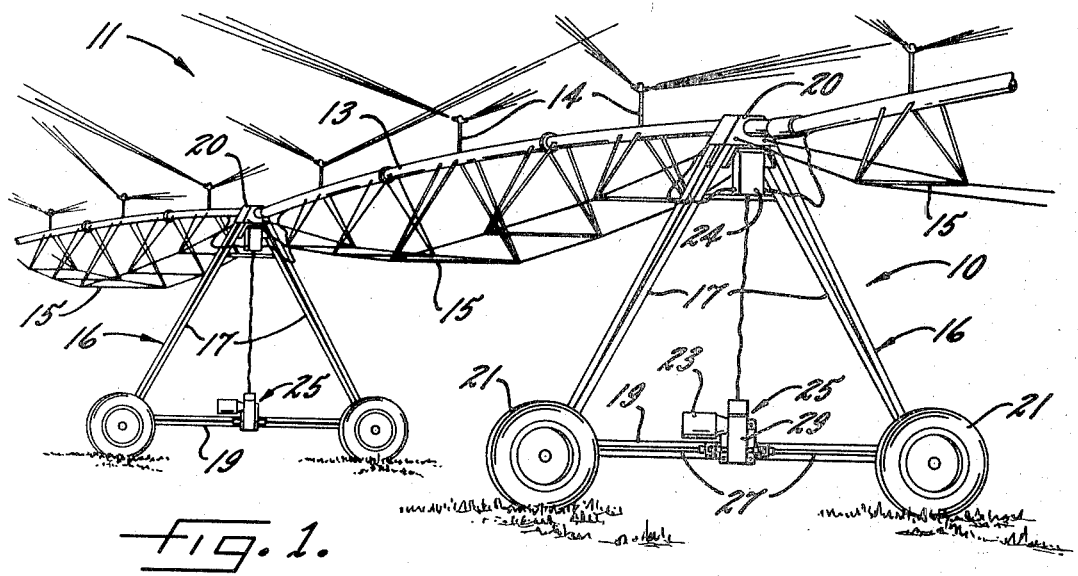
FIG. 1 is a fragmentary perspective view of a circular irrigation system including drive towers embodying the novel features of the present invention.

As shown in the drawings for purposes of illustration, the present invention is embodied in a drive tower 10 of a circular irrigation system 11 such as is used in arid regions to water land for agricultural purposes. In the irrigation system, a plurality of the towers are used both to support a water pipe 13 extending radially from a central pivot (not shown) and to carry the pipe around the pivot to water a large circular tract of land. At the pivot, the pipe communicates with a high pressure water supply and sprinkler heads 14 spaced along the pipe spray the water onto the ground as the towers slowly carry the pipe in a sweeping path around the pivot.

Between adjacent towers 10 the pipe 13 is supported by long truss sections 15 to keep the pipe high above the ground. More particularly, the pipe is connected at each tower to the upper end of a generally triangular frame 16 which is defined by two upwardly extending side members 17 and a generally horizontal lower member 19. The side members extend upwardly from opposite ends of the lower member converging toward each other to connect with a joint 20 surrounding the pipe at the upper corner of the frame. A wheel 21 rotatably mounted at each lower corner of the frame supports the tower for rolling over the ground in a circular path around the pivot. Drivingly connected to each of the wheels is an electrical motor 23 which is mounted on the lower member between the two wheels and is controlled not only by an alignment mechanism 24 adapted to keep the water pipe in a substantially true radial line by selectively actuating the motor to move the tower, but also remotely by the operator of the irrigation system 11.

In the foregoing arrangement, the tower 10 is moved slowly in its circular path around the pivot by virtue of a center drive mechanism 25 (FIG. 3) which serves to reduce the high speed input rotation of a power shaft 26 leading from the motor 23 to a substantially slower speed output rotation of a drive shaft 27 connecting to the wheels. Herein, the drive mechanism is located within a housing 29 bolted to the lower member 19 and includes a large gear 30 keyed on the drive shaft within the housing. The gear, in turn, is connected drivingly with the power shaft, the latter being located above the gear and extending into the housing from the motor. Due to the connection between the gear and the power shaft, as the latter is rotated by the motor, the gear is rotated at a much slower speed than the speed of the power shaft. This rotates the drive shaft which, in turn, drives the wheels 21 to move the tower 10 in its circular path around the pivot.

In the circular irrigation system 11 of the foregoing type, it has been found desirable to increase the length of the truss section 15 spanning the drive towers 10 in order to reduce the number of towers required to support the pipe 13 or increase the length of the irrigation system without increasing the number of towers. This necessarily places an increased burden on the towers carrying the pipe that in turn increases the amount of power needed to move the towers. Applicable governmental safety standards and regulations relating to the use of high voltage electrical power systems, such as those used under the moist conditions of circular irrigation systems, limit the size of electrical motors which may be used in the towers and thereby have the effect of limiting the length of the irrigation system.

In accordance with the primary aspect of the present invention, the length of the truss section 15 may be increased without having to increase the size of the motor 23 by virtue of the provision of a unique improvement in the drive mechanism 25 which virtually eliminates any substantial loss of power between the motor and the wheels 21. For this latter purpose, the drive mechanism includes a pawl 31 operably connected with a cam means 33 rotated by the motor to reciprocate the pawl through power and return strokes to rotate the gear 30 and thereby turn the wheels. Opposite end portions 34 and 35 of the pawl are shaped to engage with peripheral teeth 36 on the gear to push against the teeth and turn the gear as the pawl advances through its power stroke. Reversible spring means 37 acting on the pawl selectively holds the latter cocked in one direction so that one end portion 34 is biased against the gear to rotate the latter so the tower 10 is driven in a forward direction. Advantageously, by reversing the action of the spring means so the pawl is cocked in the other direction with the other end portion 35 engaging the gear, the direction of the power stroke is reversed to drive the tower in a reverse direction.

In the present instance, two pawls 31a and 31b are mounted on the cam means 33 which, preferably, comprises an eccentric 39 for each pawl, but may take various other forms such as a conventional cam or crank. The eccentrics are secured to the power shaft 26 adjacent each other (see FIG. 3) and are located within the housing 29 above the gear 30 with the pawls telescoped over the eccentrics, the latter fitting within bushed openings 40 centered in the pawls to secure the pawls pivotally on the eccentrics. More particularly, the pawls are each generally triangular in shape having a curved upper end 41 and a base 43 with the opposite end portions 34 and 35 each shaped in the form of a downwardly projecting tooth to fit between the teeth 36 of the gear. In a neutral position (not shown), the base of each pawl extends horizontally with the teeth 34 and 35 spaced equal distances above the gear but, when the pawls are cocked in one direction or the other by the spring means 37, the lower tooth on each pawl engages the teeth on the gear.

Advantageously, the centers 44 and 45 (see FIG. 4a) of the two eccentrics 39 are located in opposite directions from the center of the power shaft 26 so that the pawls 31a and 31b are driven through the power strokes alternately of each other. Therefore, at virtually every instant in time, at least one of the pawls is being driven through its power stroke so there is no wasted motion in the power shaft. This arrangement not only rotates the gear 30 continuously when the power shaft is driven by the motor, but also keeps the gear from backing up as the other pawl is retracted.

It will be appreciated that it is possible to turn the gear 30 with only one of the pawls 31 acting through its power stroke, but herein the two pawls 31a and 31b are used to push the gear in order to avoid a loss of motion in the power shaft 26. As shown in FIG. 4a, pawl 31a is completing its power stroke pushing tooth 36a of the gear to the left to turn the gear. As the power shaft continues to rotate counterclockwise, the eccentric 39a pulls the pawl 31a to the right so the tooth 36b cams against the tooth 34a to overcome the spring means 37 whereby the pawl rides up over the tooth 36b as shown in FIG. 4b. At the same time, the pawl 31b begins its power stroke sliding over the leading face of the tooth 36c of the gear until the front face of the tooth 34b of the pawl 31b engages the back face of the tooth 36b and continues to push the gear in a counterclockwise direction as viewed in FIGS. 4a, b and c. Thereafter, continued rotation of the power shaft pushes the pawl 31b to complete its power stroke moving the gear to the position illustrated in FIG. 4c. As the power stroke of the pawl 31b is completed, the pawl 31a is retracted, clicking through the groove between the teeth 36b and 36c and up over the tooth 36c to snap into a fully retracted position in the groove between the teeth 36c and 36d by virtue of the biasing action of the spring means 37.

The action of the pawls 31a and 31b as described thus far is completed during one-half of a revolution of the power shaft 26. As the latter continues to turn, the pawl 31a engages the trailing face of the tooth 36c to continue the rotation of the gear in the same manner as the action of the pawl 31b, but with the pawl 31a pushing against the trailing face of tooth 36c. The two pawls, thus, walk across the teeth of the gear, in effect, jogging it in a counterclockwise direction with each pawl pushing alternately of the other and on every other tooth of the gear. As a result, the gear turns easier with the pawls overcoming the natural inertia of the tower more readily than a steadily applied force so that it is easier to control the speed and the starting and stopping of the tower 10.

While the operation of the exemplary embodiment of the present invention has been described with the power shaft 26 rotating counterclockwise as viewed in FIGS. 4a, 4b and 4c, it will be appreciated that, if the motor 23 were reversed to drive the power shaft clockwise, the power strokes of the pawls would be in the same general direction which drives the gear 30 counterclockwise as long as the spring means 37 cocks the left end of the pawls downwardly as shown in the drawings. Counterclockwise rotation of the power shaft, however, is preferred because the general direction of action of the power strokes of the pawls tends to compliment the action of the spring means rather than to work against the action of the spring means as would happen if the power shaft were rotated clockwise.

Figure 2:
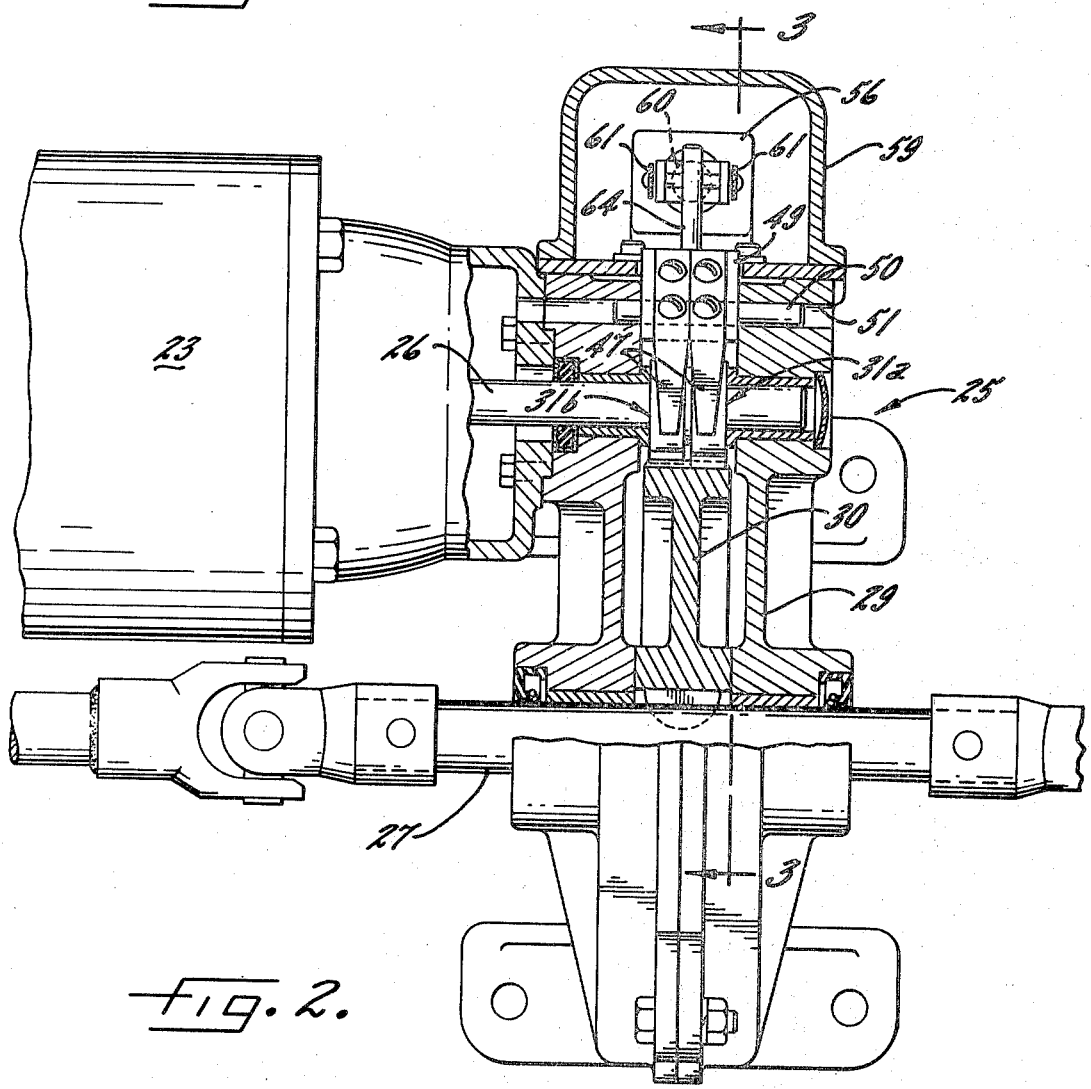
FIG. 2 is an enlarged fragmentary elevational view of a portion of the tower with parts broken away and shown in cross section.
Figure 3:
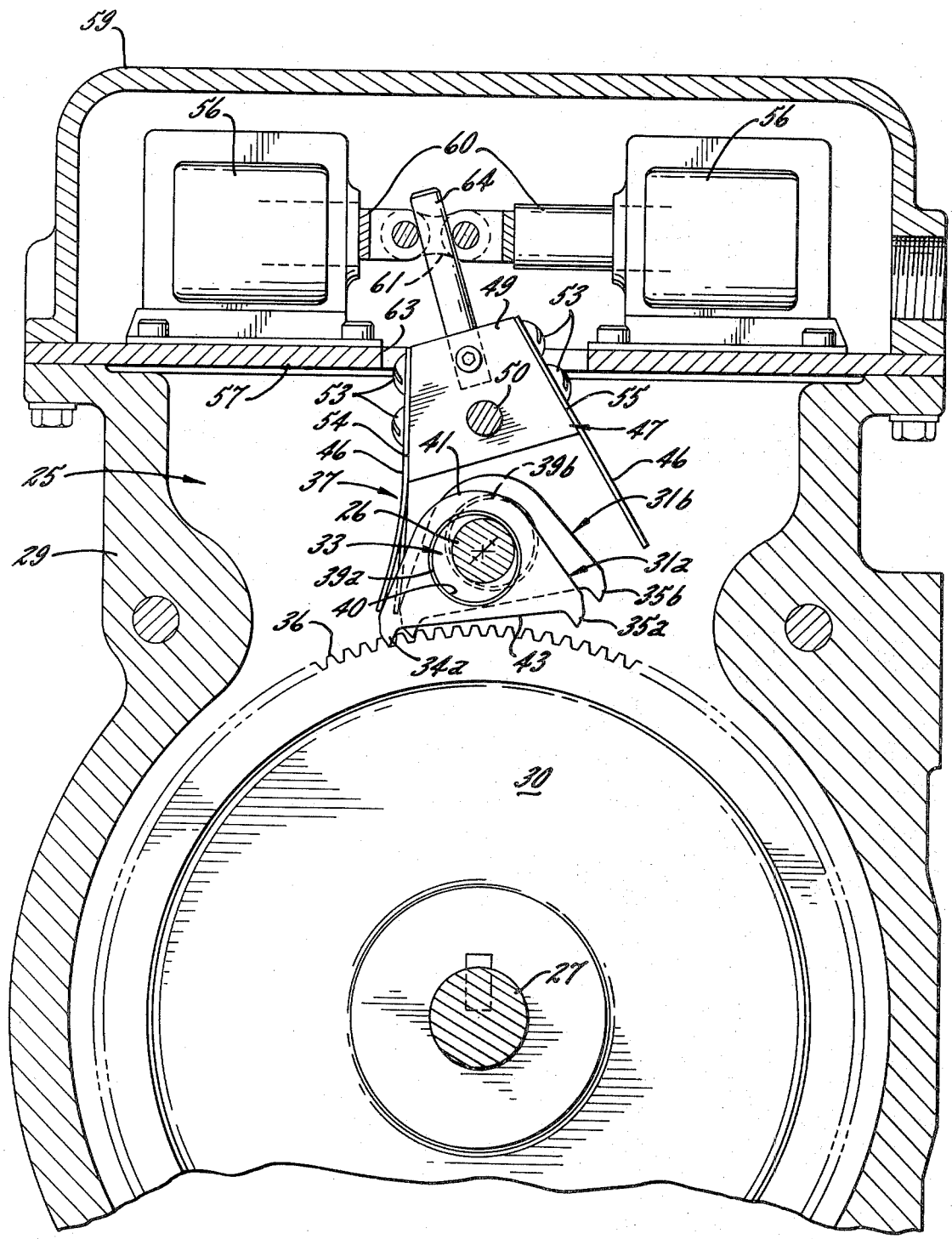
FIG. 3 is an enlarged fragmentary elevational view taken substantially along line 3—3 of FIG. 2.

Herein, it is the spring means 37 which serves to reverse the direction of rotation of the gear 30, the spring means including four leaf springs 46 attached to a carrier 47 having a body 49 which is telescoped on a pivot shaft 50 (FIG. 3). The latter is supported within a bore 51 (FIG. 2) extending through opposite sides of the housing 29 and the springs are secured to the body by screws 52, two of the springs being attached adjacent each other to one side 54 of the body and the other two springs being attached similarly to the opposite side 55 of the body. The springs extend downwardly from the body to engage the sides of the pawls 31a and 31b and cock the latter either in a counterclockwise direction, as shown in FIG. 3, or in a clockwise direction thereby holding the two pawls biased against the gear. Then, as the pawls are reciprocated back and forth by the eccentrics 39, the two lower teeth either 34a and 34b or 35a and 35b on the ends of the pawls drive the gear 30 (in a counterclockwise direction as shown in FIG. 3) with each power stroke of each of the pawls.

To reverse the direction of rotation of the gear 30 and, in turn, the direction the tower 10 is being driven, the carrier 47 is cocked in a clockwise direction (see FIG. 5). To this end, the spring means 37 further includes means for pivoting the carrier selectively between the clockwise and counterclockwise cocked positions. In the exemplary embodiment, the pivoting means preferably includes two solenoids 56 (FIG. 3) which may be controlled remotely in order to reverse the direction of movement of the gear 30. It will be appreciated, however, that other arrangements such as a simple lever, crank or the like may be used to pivot the carrier on the shaft 50 and thereby change the direction the gear is to be driven. Herein, the solenoids are mounted above the gear on a horizontal plate 57 fastened on the top of the housing and are protected by a cover 59 extending over the plate and bolted to the housing 29. Extending outwardly from each solenoid is a plunger 60 adapted to move inwardly and outwardly of its respective solenoid as the latter is energized and de-energized. The outer ends of the plungers are connected to each other by a link 61 pinned at its opposite ends to each of the plungers and extending over a rectangular opening 63 through the central portion of the plate. The opening allows a rod 64 extending upwardly from the body 49 of the carrier 47 to project between the sides of the link while also permitting the upper end of the body to move without engaging the plate 57.

With this arrangement, the solenoids 56 may be energized selectively to cock the carrier 47 in a clockwise direction causing the springs 46 on the right-hand side of the body 49 to engage the right-hand sides of the pawls 31a and 31b and thereby hold the teeth 35a and 35b against the gear 30. This has the effect of reversing the direction of the power strokes of the pawls so that, instead of driving the gear in a counterclockwise direction, the pawls drive the gear in a clockwise direction causing a reversal in the direction of movement of the tower 10.

I claim as my invention:

1. A drive tower for a circular irrigation system including a frame, a wheel rotatably mounted on said frame to support and drive the latter in forward and reverse direction, a motor mounted on said frame, a power shaft extending from said motor, a drive shaft connected to said wheel, a drive gear fixed on said drive shaft, cam means connected to said power shaft, a pawl reciprocable by said cam means and having opposite end portions selectively engageable with said gear to push said gear as said pawl reciprocates, spring means selectively movable to engage one of said end portions of said pawl to bias said one end portion against said drive gear so as to drive the gear in one direction and to engage the other end portion of said pawl to bias said other end portion against said drive gear so as to drive said gear in the opposite direction, and means connected to said spring means and controllable remotely from said tower to move said spring means selectively to engage said end portions whereby said tower may be driven in forward and reverse directions.

2. A drive tower for a circular irrigation system, said tower including a generally triangular frame having a horizontal lower member and two side members extending upwardly and converging on each other from opposite ends of said lower member, two wheels rotatably mounted on said frame at opposite ends of said lower member to support and drive said tower in forward and reverse directions, a housing mounted on said frame between said wheels, a drive shaft communicating between each of said wheels and said housing, a motor on said frame adjacent said housing, a power shaft communicating between said motor and said housing and rotatably by said motor, and means within said housing drivingly connecting said power shaft with said drive shaft and including a drive gear having a plurality of teeth extending around the periphery thereof and being fixed on said drive shaft within said housing, first and second eccentrics loaded on said power shaft and within said housing, said eccentrics having their respective centers spaced from the center of the power shaft in generally opposite directions, first and second pawls rotatably mounted on said first and second eccentrics, respectively, for reciprocal movement alternately of each other as said power shaft rotates, said pawls each having opposite first and second end portions and each end portion being shaped for engagement with the teeth of said gear and reversible spring means controllable remotely from said tower for selectively holding said first and second end portions against the teeth of said gear as said pawls reciprocate so that when said first end portions are held against the gear teeth first one and then the other of said first end portions drive the gear in one direction and so that when said second end portions are held against the gear teeth first one and then the other of said second end portions drive the gear in the opposite direction whereby said tower may be driven in forward and reverse directions.

3. A drive tower as defined by claim 2 wherein said spring means includes a support mounted within said housing adjacent said pawls, a carrier mounted on said support to pivot relative to said pawls, and a spring mounted on said carrier and bodily movable therewith to engage one of said pawls to bias the latter against the gear, means for pivoting said carrier on said support to hold said spring against said pawl, said pivoting means being controllable remotely from said tower.

4. A drive tower as defined by claim 3 with said carrier having a body with opposite ends and a set of two leaf springs connected to each other of said ends and each set depending from their respective ends of said carrier for one of said set to engage one of the end portions of said first pawl as the other of said set engages the adjacent end portion of said second pawl.

5. A drive tower as defined by claim 4 wherein said carrier includes a rod extending upwardly from the body and said pivoting means includes a link connected to the upper end of said rod and movable to pivot said carrier on said shaft.

6. A drive tower as defined by claim 5 wherein said pivoting means includes a solenoid with a reciprocable plunger connected to said link to pivot said carrier on said shaft.

* * * * *